Nov. 22, 1932.  E. A. JOHNSTON  1,888,506
COTTON PICKER
Filed July 23, 1930  3 Sheets-Sheet 1

Inventor:
E. A. Johnston.
By N. P. Doolittle
Atty.

Nov. 22, 1932.  E. A. JOHNSTON  1,888,506
COTTON PICKER
Filed July 23, 1930   3 Sheets-Sheet 2
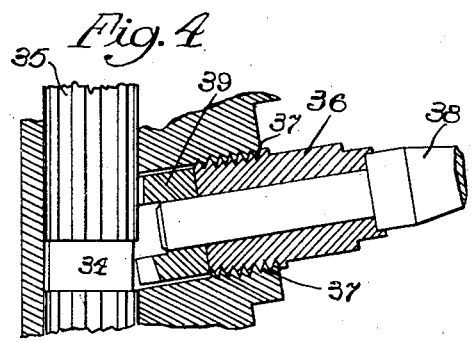
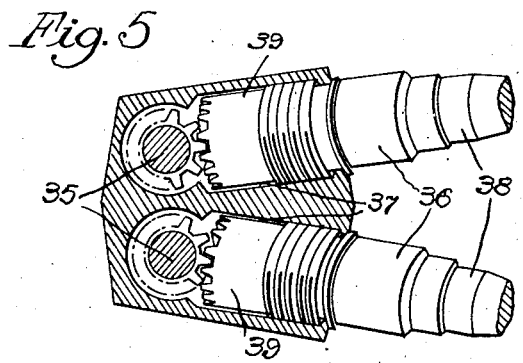
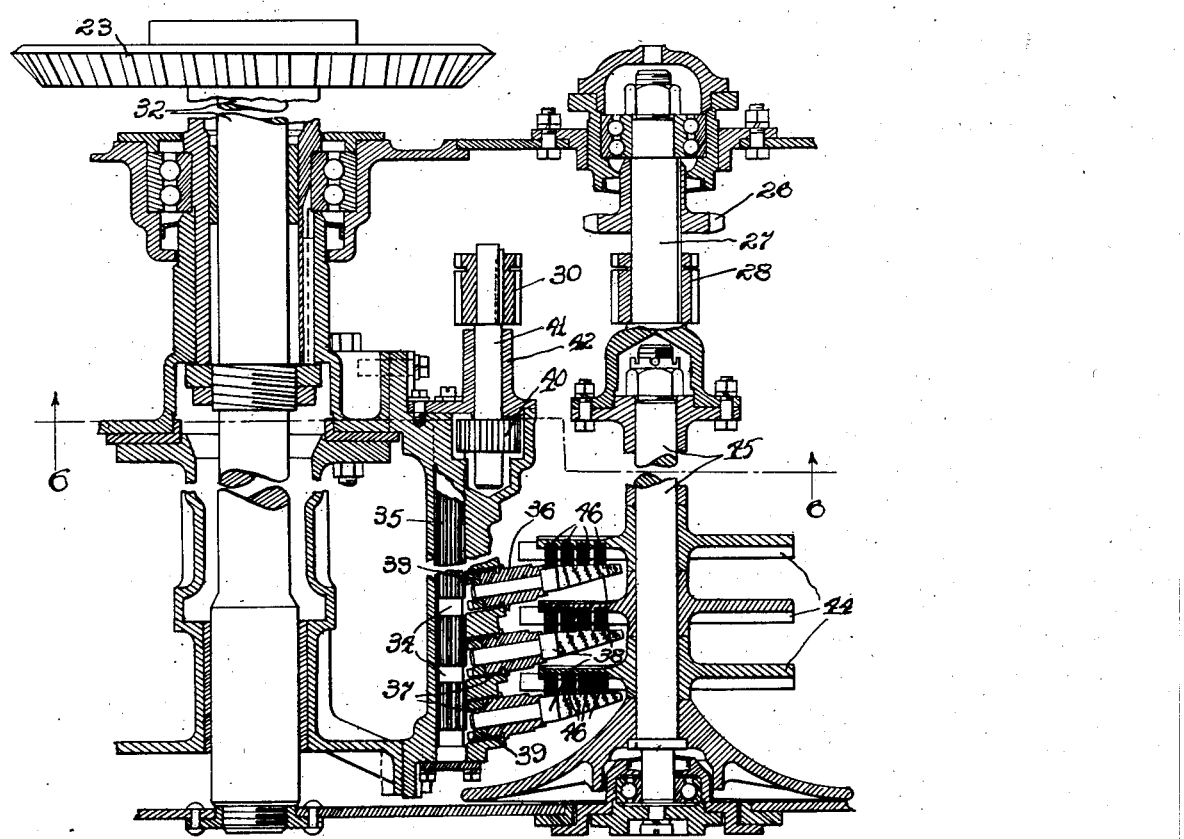

Nov. 22, 1932. E. A. JOHNSTON 1,888,506
COTTON PICKER
Filed July 23, 1930 3 Sheets-Sheet 3

Inventor:
E. A. Johnston
By H. P. Deolittle
Atty.

Patented Nov. 22, 1932

1,888,506

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

COTTON PICKER

Application filed July 23, 1930. Serial No. 470,024.

This invention relates to cotton pickers. More specifically it relates to an improved picker of the rotating spindle type.

The principal object is to provide an improved organization of picking and doffing mechanisms, giving stronger and more efficient mechanisms than heretofore employed. Another object is to simplify the driving means for said mechanisms. These objects and others, which will be apparent, are accomplished by the novel organization and details of construction shown in the drawings and described in detail.

In the drawings:

Figure 3 is a sectional view, showing the details of construction of the picking and doffing mechanisms;

Figures 4 and 5 are enlarged details, showing the mechanism for driving the picking spindles; and, Figure 6 is a section taken on the line 6—6 of Figure 3.

Figure 1:
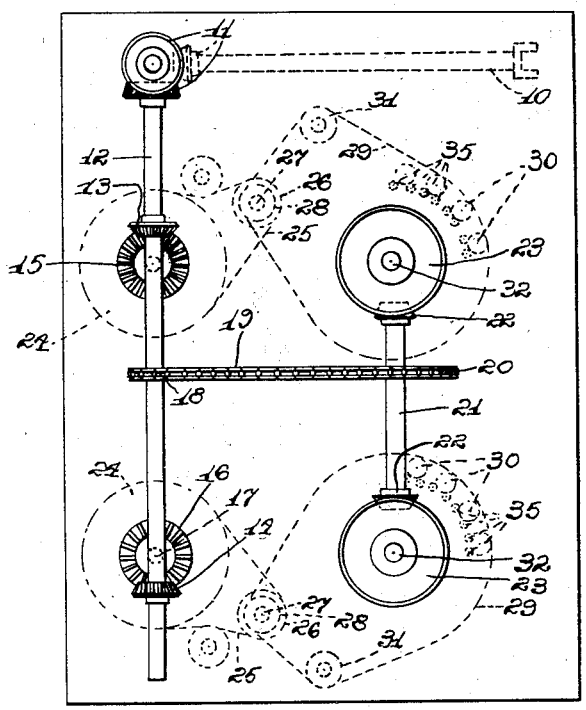
Figure 1 is a diagrammatic plan view, showing the driving means for a picker embodying the invention.

Cotton pickers employing a revolving drum on which rotating picker spindles are mounted are well known in the art. The patent to G. A. Pruser No. 1,134,158 of April 6, 1915 shows a cotton picker which employs picking mechanism and a doffing means similar to those which form the subject-matter of this invention. Only such parts of the device are shown in the drawings of this application as are necessary to explain the improved construction and its functioning. The diagrammatic views of Figures 1 and 2 show the general layout of the drums which carry the picking means and the driving mechanisms.

A picker embodying the construction of this invention may be mounted as shown in the patent previously referred to. As illustrated in Figure 1 of the drawings accompanying the present application, a drive shaft 10 is adapted to be connected to a tractor power take-off or to other driving means. Through bevel gears 11, power is transmitted to the transverse shaft 12. Through bevel gears 13 and 14 on the shaft 12 and gears 15 and 16, power is transmitted to vertical shafts 17. By means of a chain sprocket 18 mounted on the shaft 12, power is transmitted through a chain 19 to a larger chain sprocket 20 mounted on a transverse shaft 21. By means of bevel gears 22 at each end of the shaft 21, power is transmitted to large bevel gears 23, which drive the laterally spaced drums or cylinders on which the picker fingers are carried. Each of the vertical shafts 17 carries a chain sprocket 24. By means of a chain 25 and a chain sprocket 26, power is transmitted to the shaft 27 which operates the doffing mechanism adjacent each picker drum. A chain sprocket 28 on the shaft 27 supports a chain 29 which extends around the drum carrying the picker spindles and engages a plurality of gears 30, which provide means for rotating the spindles, as will hereinafter be described in detail.

Figure 2:
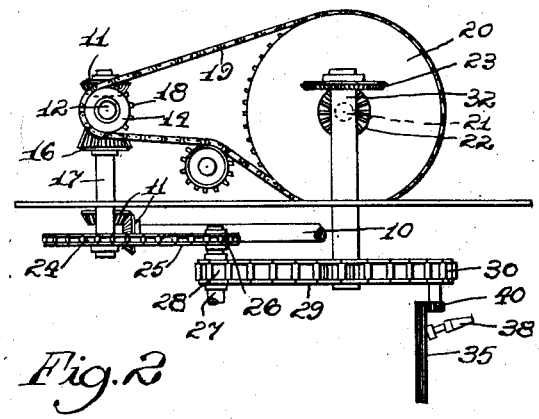
Figure 2 is an elevation of the same structure shown in Figure 1.

An idler sprocket 31 holds the chain 29 away from the revolving drum, as shown in Figure 1. All of the shafts shown in Figure 1 are mounted in suitable bearings in any conventional manner.

Figure 3 shows the particular construction and mounting of the picking and doffing mechanisms. The bevel gear 23 is mounted on a vertical shaft 32. A drum-like structure, on which the rotatable picker spindles are mounted, is attached to the shaft 32 for rotation therewith. The particular construction of the rotatable drum structure is immaterial in so far as this invention is concerned, but, in the present embodiment of the invention, a series of wedge-shaped bars 33 are mounted in contacting relation around a central supporting structure, forming an annular construction there-around. Each of the wedge-shaped members 33 is provided with a pair of vertical bores in which parallel shafts 35 are journaled. A series of tubular spindle carriers or supports 36 are mounted in bores 37 extending substantially radially outwardly through the outer wall of the members 33 and upwardly at an angle with respect to horizontal. Conical picker spindles 38 are journaled in the supports 36, which spindles form the subject-matter of co-pending application Serial No. 451,570 filed May 12, 1930. On the inner end of the fingers 38, a sleeve 39 is rigidly secured. Said sleeve has crown gears cut on its radial face. Each of the shafts 35 is provided with teeth running parallel to the axis thereof, said teeth being adapted to operatively engage the teeth of the crown gears on the sleeves 39. A portion of the shaft 35 is cut away below each crown gear to provide a clearance space for the lower portions of said gears, which portions are not in engagement with the shaft.

At the upper end of each of the shafts 35, gear teeth are formed and gears 40 mounted on shafts 41 are provided for engaging and driving said shafts. The shafts 41 extend upwardly through bearing members 42 and provide means for mounting the chain sprockets 30, previously described in connection with the driving mechanism. It will be understood that each of the gears 40 engages and drives two of the shafts 35, as best shown in Figure 6.

The doffing mechanism consists essentially of a plurality of disk-shaped carrier members 44 mounted in spaced relation on the shaft 45. A series of brushes 46 is mounted at spaced intervals on the members 44. The shaft 45 is attached to an aligned shaft 27, which is journaled in bearings on the frame structure which carries the picker. A chain sprocket 28 mounted on the shaft 27 provides means for driving the doffing mechanism, as previously described with reference to the diagrammatic drawings of Figures 1 and 2.

In the operation of this device, the drum structure is rotated at a moderate speed through the bevel gear 23. The doffing mechanism is rotated at a high speed by transmission of power to the shaft 27 by means of the chain sprocket 28. It will be noted that the disks 44, on which the driving brushes 46 are mounted, lie in a plane at right angles to the shaft 45. It will also be noted that the conical picking spindles 38 extend at such an angle upwardly that their upper edges lie in planes perpendicular to the axis of rotation of the drum structure. The spindles are arranged in vertical rows and also in spaced circumferential rows. The upper edges of the fingers in each circumferential row lie in the same horizontal plane, so that it may be said that each spindle in a circumferential row is tangent to the same horizontal plane. It will be understood that by this construction, with the doffing brushes set to frictionally engage the picking fingers, there will be a continuous action throughout the zone, in which the annular area described by the doffing brushes overlaps the annular area described by the upper edges of the picking fingers.

Figure 6:
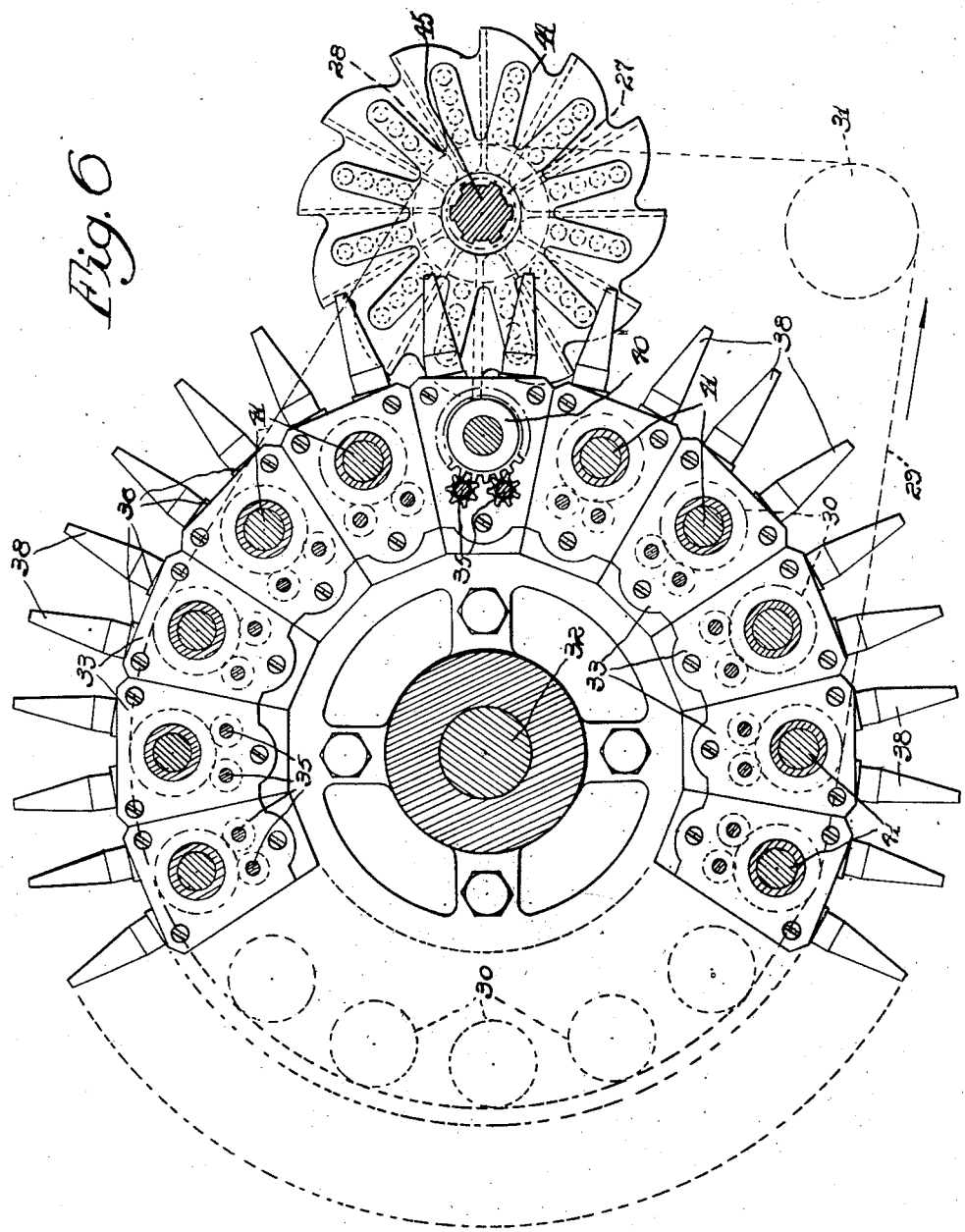

By referring to Figure 6, it will be noted that the chain 29 shown in dotted lines, which extends around the sprocket 28 on the shaft 27 and around the sprockets 43 on the shafts 41, does not engage the sprockets 43 during a portion of their path of rotation on the drum structure. The direction of rotation of the drum structure is as shown by the arrow 70 in Figure 6. When the chain successively disengages from the sprockets 43, the picking spindles driven by those sprockets cease to rotate. When the fingers reach the doffing mechanism, they are not rotating about their own axes.

As shown in Figure 6, the disks 44, on which the doffing brushes are mounted, have a series of indentations around the periphery to form a saw tooth edge. This edge extends beyond the base of the picking spindles to assist in removing cotton therefrom.

It is to be understood that applicant has shown and described only a preferred embodiment of his improved cotton picking and stripping mechanism. It may be found desirable to alter the angular position of the picking fingers with respect to the drum structure. For example, the fingers may be arranged at a tangent rather than radially outward as shown in this embodiment. It is also to be understood that the particular arrangement of the picking spindles and the doffing mechanism may be embodied in cotton pickers of constructions which differ from that illustrated. Applicant limits his invention only by the scope of the appended claims.

What is claimed as new is:

1. A cotton picker comprising a drum structure mounted for rotation, a plurality of conical picker spindles mounted for rotation on the drum structure, and doffing means comprising carriers mounted for movement in overlapping relationship with respect to the spindles and brushes mounted on said carriers and positioned to contact with the surfaces of said conical spindles, the axes of the spindles being at an angle with respect to the contacting surfaces of the brushes whereby an area of contact is obtained.

2. A cotton picker comprising a drum structure mounted for rotation, a plurality of conical picker spindles mounted for rotation on the drum structure, and doffing means comprising carriers mounted for rotation and brushes mounted thereon and positioned to tangentially engage the surfaces of said conical spindles, the axes of the spindles being at an angle with respect to the engaging surfaces of the brushes whereby an area of contact is obtained.

3. A cotton picker comprising a drum structure mounted for rotation, a plurality of conical picker spindles mounted for rotation on the drum structure, said spindles being arranged in circumferential rows, and doffing means comprising a series of carriers mounted for rotation and brushes positioned thereon, the brushes of each carrier being positioned to tangentially engage successively the spindles of a circumferential row, the axes of the spindles being at an angle with respect to the engaging surfaces of the brushes whereby an area of contact is obtained.

4. A cotton picker comprising a drum structure mounted for rotation and a plurality of conical picker spindles mounted for rotation on the drum structure, said spindles being mounted with a line on the surface of each spindle lying in a plane perpendicular to the axis of the drum structure, said lines passing through the drum axis.

5. A cotton picker comprising a drum structure mounted for rotation and a plurality of conical picker spindles mounted for rotation on the drum structure said spindles being arranged in circumferential rows and projecting from the drum structure at such an angle that a line on the surface of each spindle lies in a plane perpendicular to the axis of the drum, said lines passing through the drum axis.

6. A cotton picker comprising a drum structure mounted for rotation and a plurality of conical picker spindles mounted for rotation thereon said spindles being arranged in circumferential rows and projecting from the drum structure at such an angle that the conical surfaces of all the spindles in each circumferential row are tangent to a plane perpendicular to the axis of the drum structure.

7. A cotton picker comprising a drum structure mounted for rotation and a series of conical picker spindles mounted for rotation thereon said spindles being arranged in rows parallel to the axis of the drum structure and projecting at an angle such that the surface of each spindle is tangent with a plane perpendicular to the axis of the drum structure.

8. A device as set forth in claim 7, in which shafts parallel to the axis of the drum structure are mounted thereon for driving the axial rows of picker spindles.

9. A cotton picker comprising a drum structure mounted for rotation on a vertical axis and a plurality of conical picking spindles mounted for rotation thereon, said spindles projecting from the drum with their upper edges lying in horizontal planes.

10. A cotton picker comprising a drum structure mounted for rotation on a vertical axis and a plurality of conical picking spindles mounted for rotation thereon, said spindles being arranged in circumferential rows and projecting from the drum structure with the upper edges of each circumferential row lying in the same horizontal plane.

11. A cotton picker comprising a drum structure mounted for rotation on a vertical axis and a series of conical picking spindles mounted for rotation thereon, said spindles being arranged in vertical rows and projecting from the drum structure with their upper edges lying in horizontal planes.

12. A cotton picker comprising a drum structure mounted for rotation, a plurality of conical picking spindles mounted for rotation thereon, said spindles projecting from the drum structure at such an angle that the conical surface of each spindle is tangent to a plane perpendicular to the axis of the drum structure, means for rotating the drum structure, means for rotating the spindles mounted thereon, a doffing mechanism comprising carriers mounted on an axis parallel to the axis of the drum structure, and brushes mounted on said carriers and positioned to frictionally engage the surfaces of the picking spindles.

13. A cotton picker comprising a drum structure mounted for rotation, a series of conical picking fingers mounted for rotation on said drum, said fingers being positioned in axially spaced circumferential rows, said fingers extending outwardly from the drum and upwardly at such an angle that the upper edges of the fingers in each circumferential row lie in substantially the same plane, means for rotating the drum, means for rotating the fingers mounted thereon, a doffing mechanism comprising a carrier mounted in spaced relation above each circumferential row of picking fingers, and brushes positioned on said carrier, said brushes frictionally engaging the upper surfaces of said fingers.

14. A cotton picker comprising a drum structure mounted for rotation and a plurality of conical picking spindles mounted for rotation thereon and projecting from the drum structure at such an angle that the conical portion of each spindle is tangent to a plane perpendicular to the axis of the drum structure.

In testimony whereof I affix my signature.
EDWARD A. JOHNSTON.